United States Patent
Casper (10) Patent No.: US 8,785,820 B2
(45) Date of Patent: Jul. 22, 2014

(54) RESONANT POWER SUPPLY FOR USE WITH HIGH INDUCTIVE LOADS AND METHOD OF PROVIDING SAME

(75) Inventor: Ted Casper, West Bend, WI (US)

(73) Assignee: Leco Corporation, St. Joseph, MI (US)

( * ) Notice: Subject to any disclaimer, the term of this patent is extended or adjusted under 35 U.S.C. 154(b) by 691 days.

(21) Appl. No.: 12/939,392

(22) Filed: Nov. 4, 2010

(65) Prior Publication Data

US 2012/0111850 A1    May 10, 2012

(51) Int. Cl.
*F27B 14/00*    (2006.01)

(52) U.S. Cl.
USPC .................. 219/420; 219/425; 373/138

(58) Field of Classification Search
USPC ............ 219/420, 421–427; 307/104; 363/15, 363/16, 17; 373/138, 144, 147–150
See application file for complete search history.

(56) References Cited

U.S. PATENT DOCUMENTS

| | | | | |
|---|---|---|---|---|
| 4,060,757 A | * | 11/1977 | McMurray | 363/57 |
| 4,257,087 A | * | 3/1981 | Cuk | 363/16 |
| 4,348,598 A | * | 9/1982 | Smith | 327/579 |
| 4,460,949 A | * | 7/1984 | Steigerwald | 363/28 |
| 4,559,590 A | * | 12/1985 | Davidson | 363/21.02 |
| 5,442,539 A | | 8/1995 | Cuk et al. | |
| 5,642,267 A | * | 6/1997 | Brkovic et al. | 363/16 |
| 5,959,849 A | * | 9/1999 | Batarseh et al. | 363/16 |
| 6,542,535 B2 | * | 4/2003 | Fishman et al. | 373/150 |
| 6,546,039 B2 | * | 4/2003 | Fishman et al. | 373/146 |
| 6,798,822 B2 | * | 9/2004 | Fishman et al. | 373/146 |
| 6,807,069 B2 | * | 10/2004 | Nieminen et al. | 363/17 |
| 8,288,954 B2 | * | 10/2012 | Melanson | 315/219 |
| 2002/0122456 A1 | * | 9/2002 | Fishman et al. | 373/150 |
| 2003/0016724 A1 | * | 1/2003 | Fishman et al. | 373/146 |
| 2004/0028111 A1 | * | 2/2004 | Fishman et al. | 373/146 |
| 2006/0118549 A1 | * | 6/2006 | Fishman et al. | 219/656 |
| 2006/0140245 A1 | * | 6/2006 | Wynn et al. | 373/138 |
| 2006/0290295 A1 | * | 12/2006 | Yang et al. | 315/274 |
| 2008/0063025 A1 | * | 3/2008 | Fishman et al. | 373/144 |
| 2009/0114640 A1 | * | 5/2009 | Nadot et al. | 219/634 |
| 2010/0244726 A1 | * | 9/2010 | Melanson | 315/291 |

OTHER PUBLICATIONS

Zhongming Ye et al., "A Full-Bridge Resonant Inverter With Modified Phase-Shift Modulation for High Frequency AC Power Distribution Systems," pp. 2831-2845, IEEE Transactions on Industrial Electronics, vol. 54, No. 5, Oct. 2007.

* cited by examiner

*Primary Examiner* — John Wasaff
(74) *Attorney, Agent, or Firm* — Price Heneveld LLP (57) ABSTRACT

A resonant power supply (900) for use with high inductive loads includes an input rectifier (903) and a switching inverter formed using a plurality of parallel connected half bridge networks for switching the voltage provided from the input rectifier (903). A transformer (927) is used whose primary is connected to the switching inverter and whose secondary is connected to load such as a crucible (931). A capacitor (929) is used in series with the primary of the transformer (927) for resonating the inductance in the secondary circuit at the frequency of the switching inverter to provide maximum power transfer to the crucible (931).

17 Claims, 6 Drawing Sheets

RESONANT POWER SUPPLY FOR USE WITH HIGH INDUCTIVE LOADS AND METHOD OF PROVIDING SAME

FIELD OF THE INVENTION

The present invention generally relates to power supplies and more particularly to a resonant alternating current (AC) power supply for delivering power to a transformer coupled load containing high inductive reactance such as a crucible in an electrode furnace by using a capacitor connected in series with the primary of the transformer for resonating the transformer secondary circuit inductance at the switching frequency.

BACKGROUND OF THE INVENTION

An electrode furnace (EF) enables rapid heating of a sample material used to create gases. These gases are then analyzed for their composition using a variety of scientific methods. The EF operates by generating a high current which is passed through a graphite crucible using an electrode. The current heats the crucible and any sample material therein in excess of three thousand degrees Celsius (3000° C.).

Prior art systems have used large mains-frequency (50 Hz-60 Hz) power supplies to generate the high currents necessary to rapidly produce enough heat to drive off gases in the sample material. These types of linear power supplies require a large iron core transformer making them bulky and difficult to integrate into the EF. Although higher frequency switching supplies can be used for reducing the transformer size, these types of switching supplies often have problems when delivering a high current to the load. This is primarily due to the stray and/or residual inductance created by the braided or other flexible lead wire used in connection with the electrode, the electrode inductance, and the transformer leakage inductance. The stray inductance results in a impedance that increases with frequency and is in series with the crucible resistance. At typical mains input frequencies of 50 Hz-60 Hz, the stray inductance contributes an insignificant amount of inductive reactance to the system. Therefore, the transformer secondary circuit impedance is dominated by the crucible resistance at 50 Hz-60 Hz. At switching frequencies normally utilized by switching power supplies, the inductive reactance created by the stray inductance can be many times that of the crucible resistance.

Figure 1:
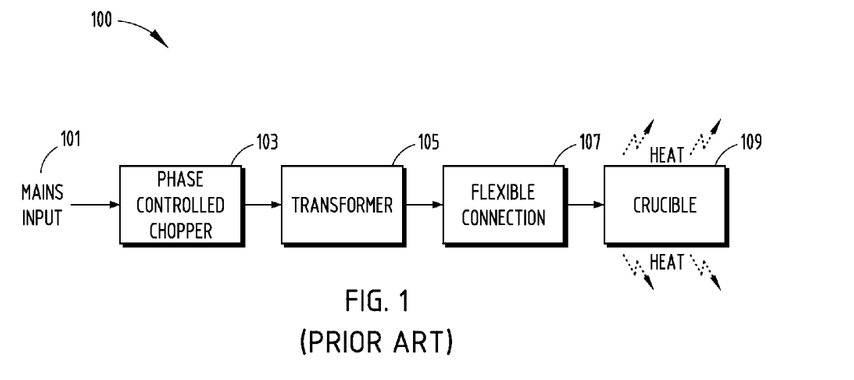
FIG. 1 is a prior art block diagram showing heating of a crucible in an electrode furnace.

FIG. 1 is a block diagram illustrating a prior art EF system 100 using a phase chopper supply. As described herein, the EF system 100 is used for heating a crucible 109. A mains input voltage 101 is supplied to a phase controlled chopper 103 used to regulate the output current of a step down transformer 105. The transformer 105 works to supply a substantially high current through a flexible connection 107 to a crucible 109. The crucible 109 is used for holding analytical samples. The flexible connection 107 consists of the secondary circuit leads and the electrodes used to hold the crucible 109. Because the phase controlled chopper 103 only conducts during a portion of the mains input 101 alternating cycle, the phase controlled chopper 103 heavily loads the mains input voltage 101 by drawing large amounts of non-sinusoidal current. This often results in voltage disturbances to other devices connected to the same mains supply. Moreover, the non-sinusoidal current drain creates a poor power factor that increases the apparent power required to operate these devices.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE PREFERRED EMBODIMENTS

Before describing in detail embodiments that are in accordance with the present invention, it should be observed that the embodiments reside primarily in combinations of method steps and apparatus components related to a power supply used for an electrode furnace. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a resonant alternating current (AC) power supply for delivering power to a transformer coupled load containing high inductive reactance as described herein. The non-processor circuits may include, but are not limited to, a radio receiver, a radio transmitter, signal drivers, clock circuits, power source circuits, and user input devices. As such, these functions may be interpreted as steps of a method for using a resonant AC power supply for delivering power to a transformer coupled load containing a high inductive reactance. Alternatively, some or all functions could be implemented by a state machine that has no stored program instructions, or in one or more application specific integrated circuits (ASICs), in which each function or some combinations of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 2:
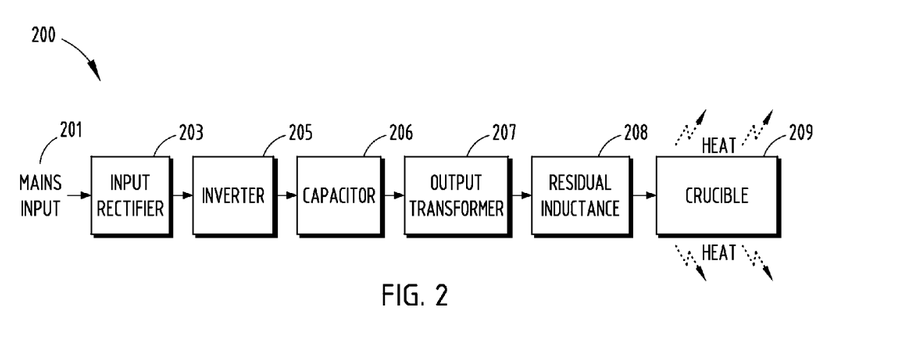
FIG. 2 is a block diagram of the switching supply used in connection with the electrode furnace of the invention.

FIG. 2 is a block diagram of a switching supply system 200 used in connection with an electrode furnace in accordance with an embodiment of the invention. The switching supply system 200 includes an input voltage 201 operating at approximately 230V at 50 Hz-60 Hz single phase alternating current (AC). This input voltage 201 is supplied to an input rectifier 203 used for providing a direct current (DC) voltage source. Those skilled in the art will recognize that any means of rectification can be used to provide this AC to DC conversion including but not limited to solid state switching circuits or the like. Thus, the input rectifier 203 is optional and may be omitted if a single polarity voltage source were provided directly to a switching inverter as described herein.

Thereafter, an inverter 205 is used to alter the rectified DC voltage to switched AC voltage operating at some predetermined switching frequency. In use, the inverter 205 switches an input voltage typically in a range between 25 kHz and 1 MHz. Although frequencies below 25 kHz can also be used, this can sometimes create problems with acoustical noise that will be perceptible to persons near the supply. The inverter 205 provides an AC voltage that is supplied to a series connected resonant capacitor 206 and output transformer 207. As compared to transformers using a conventional 60 Hz design, the output transformer 207 is much smaller in physical size. The reduction in transformer size with increased application frequency works as an advantage to the invention as described herein.

The secondary winding of the transformer forms a series winding comprised of a residual or stray inductance 208 and a crucible 209. This residual inductance 208 is created by the various types of electrical leads and/or probes connecting the transformer to the crucible 209 including the leakage inductance of transformer 207. The residual inductance 208 is an undesired component and not designed into the power supply. In use, the transformer 207 reflects and/or transforms the crucible 209 resistance to a level that will allow the inverter 205 to deliver the desired amount of power into the crucible 209. If inadequate power is supplied to the crucible 209, it will not completely drive off gases from the sample materials to produce the necessary gas for analysis. Further, the capacitor 206 is connected to the primary winding of the transformer 207 for allowing the maximum power transfer to the crucible 209. The value of the capacitor 206 is selected to resonate with the residual inductance 208 at the desired operating frequency. In this application, the total desired power ($I^2R$) provided to the crucible 209 will be approximately 8.75 kW. This is based upon the crucible 209 having a typical resistance of 5.6 milliohms (0.0056□) at a current of approximately 1250 amps. When connected to the secondary of the output transformer 207, the applied power rapidly heats the crucible 209 which in-turn transfers heat to a sample.

Figure 3:
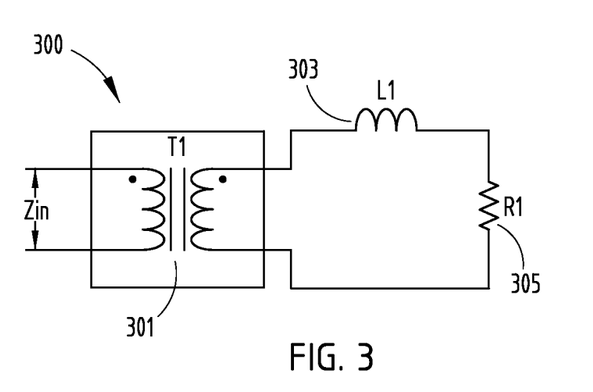
FIG. 3 is a schematic diagram illustrating the transformer and its secondary circuit connected to the crucible along with the residual inductance created by making the connection between the crucible and the transformer secondary.

FIG. 3 is a schematic diagram of an equivalent circuit 300 illustrating a transformer 301, crucible resistance 305, and a residual inductance 303 that may be used to represent transformer 207, crucible 209 and the residual inductance 208 respectively, as shown in FIG. 2. The input impedance ($Z_{in}$) is the impedance present at the primary winding of transformer 301 as seen by the switched voltage from an inverter 205, as shown in FIG. 2. By way of example, the residual inductance 303 may be approximately 150 nH with a crucible resistance 305 of 5.6 milliohms. By way of example, the turns ratio of the transformer may be 23:1. The transformer 301 is used to increase the impedance value of the crucible resistance 305 to a value required for an inverter 205 (shown in FIG. 2) to supply the desired amount of power to heat samples in the crucible 209. Although depicted as a single transformer, the transformer 301 could be realized by the series or parallel connection of multiple transformers.

Figure 4:
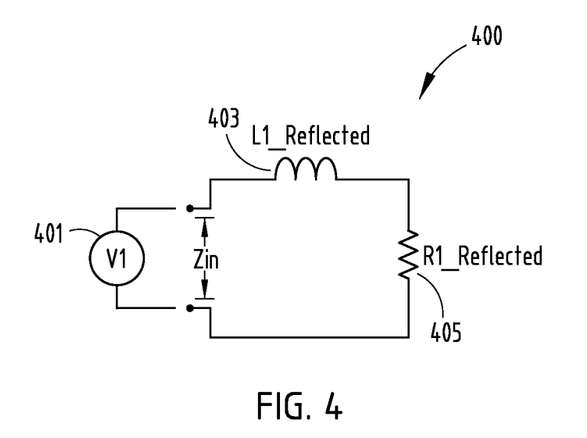
FIG. 4 is a schematic diagram illustrating an equivalent circuit of the crucible resistance and secondary residual inductance transformed through the transformer where input ($Z_{in}$) is the same value as that measured in FIG. 3 and measured with source V1 removed.

Turning again to FIG. 3, the transformer 301 also works to increase the impedance created by the residual inductance 303 by the square of the transformer turns ratio. The series connected 150 nH inductance 303 and 5.6 milliohm resistance 305 are transformed by transformer 301 to appear across the transformer primary as a 79.35 µH inductor in series with a 2.96 ohm resistor. For analysis, the input impedance ($Z_{in}$) of the primary winding of the transformer 301 can be represented by the transformed secondary impedance as described in FIG. 4. FIG. 4 is a schematic diagram illustrating the equivalent circuit of the crucible resistance 405 and residual inductance 403 transformed or reflected by transformer 301. FIG. 4 represents the load impedance that an inverter would drive when connected directly to the transformer primary. Using the typical values found in the EF system described in FIG. 3, the input impedance ($Z_{in}$) is calculated using a real value 405 of 2.96 ohms with a series inductive reactance 403 of 12.5 ohms at 25 kHz. Therefore, it should be evident to those skilled in the art, that this high value of residual inductance will restrict the current flow at the high switching frequency of the inverter.

In this equivalent circuit, it is assumed that the input voltage 401 is provided by an inverter with a minimum 360V peak to peak volts AC output. This corresponds to the minimum voltage expected from the AC mains supply. In an ideal situation, if no residual inductance 403 were present, using a typical 2.96 ohm inverter load 405, the maximum power level ($V^2/R$) that could be obtained at one hundred percent (100%) duty cycle will be approximately 10.9 kW. Those skilled in the art will recognize that this exceeds the typical design goal of 8.75 kW for providing adequate power to the crucible.

Using this same design scenario, the expected root mean square (RMS) current at an inverter would be approximately 60.8 amps assuming one hundred percent (100%) efficiency and a 10.9 kW power output.

Figure 5:
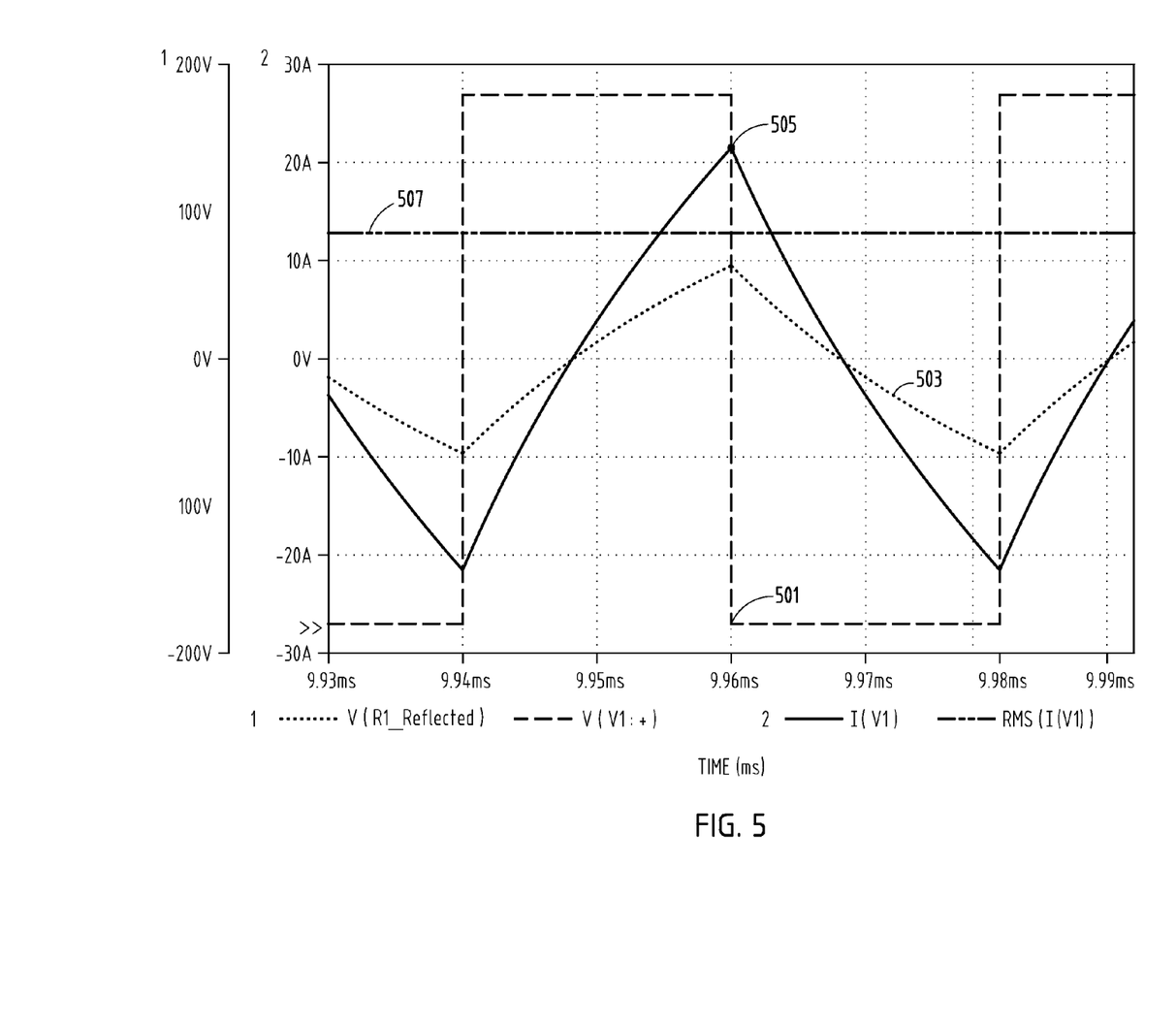
FIG. 5 is a graph illustrating the current and voltage of the circuit shown in FIG. 4 if stimulated by a 180V (360 Vpp) square wave.

FIG. 5 is a graph illustrating the current and voltage of the equivalent circuit shown in FIG. 4. The graph shows the analysis of the equivalent circuit when driven by a 180V (360 Vpp) bipolar square wave 501. The voltage 503 at the reflected crucible resistance is approximately 120 Vpp representing only about thirty three (33%) of the applied voltage potential. The current at the time the inverter transitions polarity is at a peak at 21.6 A 505. The RMS current in the circuit is 12.9 A 507. Thus, the power supplied to the crucible is only 492 watts. One solution that could be used to deliver the desired 8.75 kW to the crucible would be to change the transformer's primary-to-secondary turns ratio. For example, reducing the turns ratio of the transformer to 6:1, would change the reflected impedance seen by the inverter to 0.202 ohms with a series inductive reactance of 0.848 ohms (5.4 uH at 25 kHz).

Figure 6:
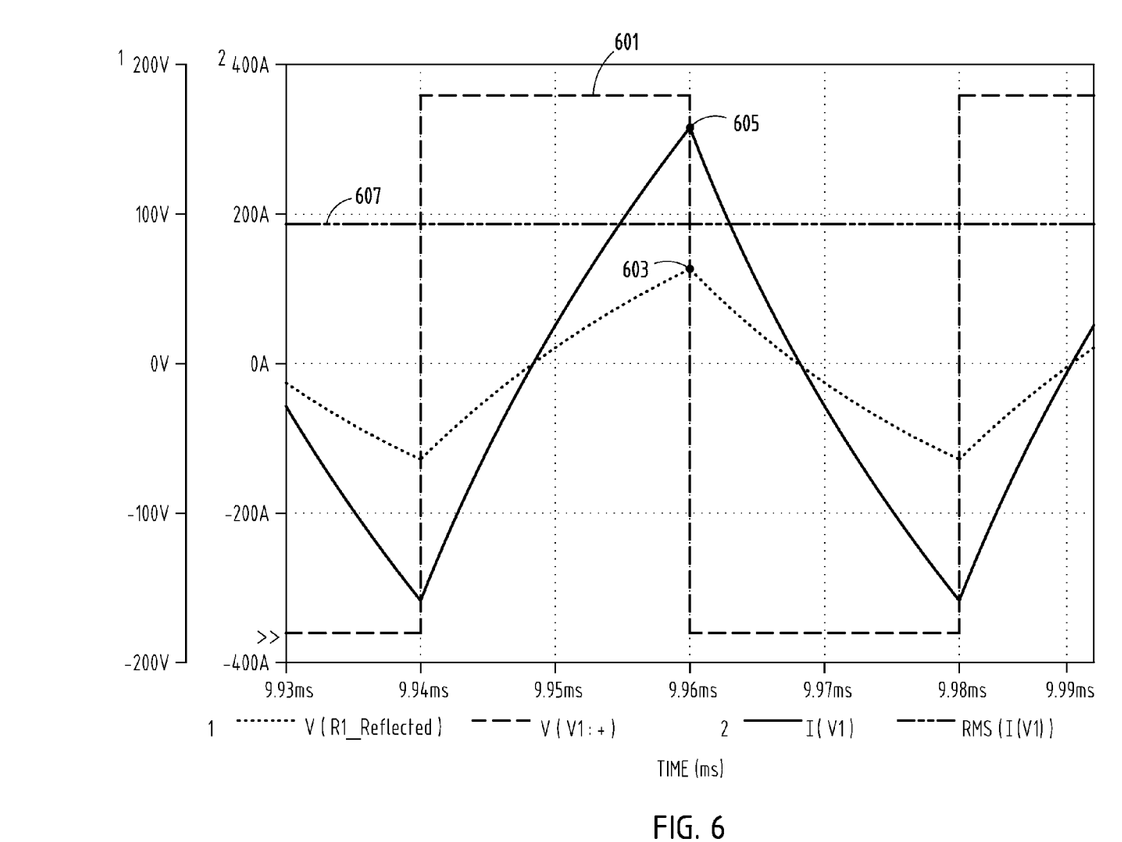
FIG. 6 is a graph illustrating the inverter current and voltages required to achieve near 8.75 kW output with a 180V power supply.

FIG. 6 is a graph illustrating the inverter voltage and current required to achieve a near 8.75 kW output power with a 180V power supply using a transformer having a 6:1 turns ratio. In the graph, a 180V square wave 601 is provided from the switching inverter resulting in a voltage 603 of approximately 65 volts peak at the reflected crucible resistance 405 of 0.202 ohms. The peak current 605 is shown at approximately 319 amps and occurs during the transition of the inverter voltage. The graph shows an RMS circuit current 607 of approximately 188 amps. This will result in power to be delivered to a crucible of only 7.13 KW. The waveforms show that the residual inductance dominates the impedance of the circuit. This slows the application of power to the crucible and results in the inverter having to switch high peak currents in order to achieve a desired power level. These high peak currents adversely effect the transformer winding size and the inverter's switching component current ratings.

Figure 7:
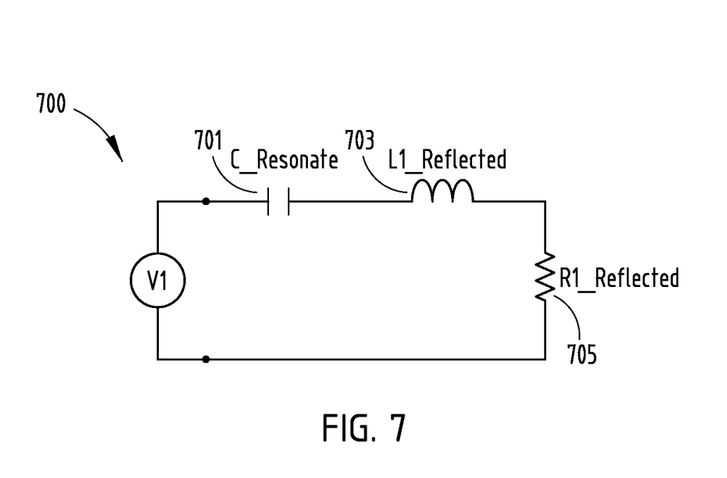
FIG. 7 is a schematic diagram illustrating the primary equivalent resonant circuit showing the transformed crucible resistance and residual inductance along with the resonating capacitor.

FIG. 7 illustrates a primary equivalent resonant circuit for transforming the crucible resistance and residual inductance using a capacitor. In order to reduce the adverse effects of the residual inductance, the present invention includes the use of a capacitor 701. The capacitor 701 is inserted in series with the transformer primary and creates a resonant circuit with a reflected secondary inductance 703 and a reflected crucible resistance represented by a load 705. When resonance is achieved at the predetermined switching frequency, a maximum transfer of power occurs. In use, the value of the capacitor is specifically chosen in order to create a series resonant circuit with a minimum impedance at the switching frequency of the inverter. For example, if a transformer were selected with a 23:1 turns ratio, the reflected inductance will be approximately 79.35 uH. When using a 2.96 ohm inverter load, a capacitor would be selected having a value of approximately 0.51 uF to achieve resonance at a 25 kHz switching frequency. Those skilled in the art will also recognize that a commercially available capacitor value should be chosen and/or the inverter frequency selected to more easily achieve circuit resonance. The automatic selection of an optimum switching frequency to achieve resonance can be also accomplished through the use of a phase lock loop (PLL) or similar device. The PLL would be used to tune the inverter switching to the frequency of the resonant circuit.

Figure 8:
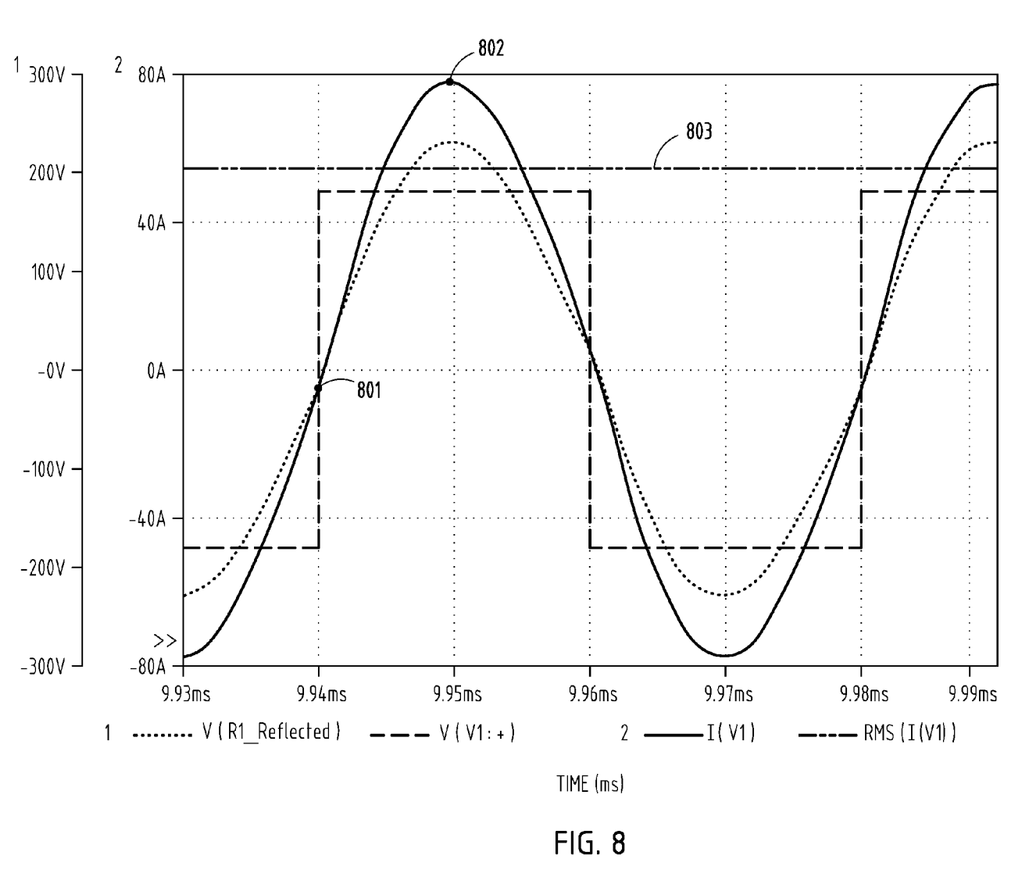
FIG. 8 is a graph illustrating the current and voltage of the circuit shown in FIG. 7.

FIG. 8 is a graph illustrating the current and voltage achieved using the resonant circuit shown in FIG. 7. The current when the inverter transitions through its polarity switching state is reduced to approximately 5 amps at point 801. The peak circuit current is approximately 77.5 amps at point 802, and the RMS current is approximately 54.7 amps 803 into the 2.96 ohm load resistance. This equates to a power in the crucible of approximately 8.86 kW. Compared to the current levels obtained without the capacitor 701, the peak currents in the inverter are reduced by more than a factor of 4 while the current when the inverter transitions polarity is reduced by more than a factor of 60.

Figure 9:
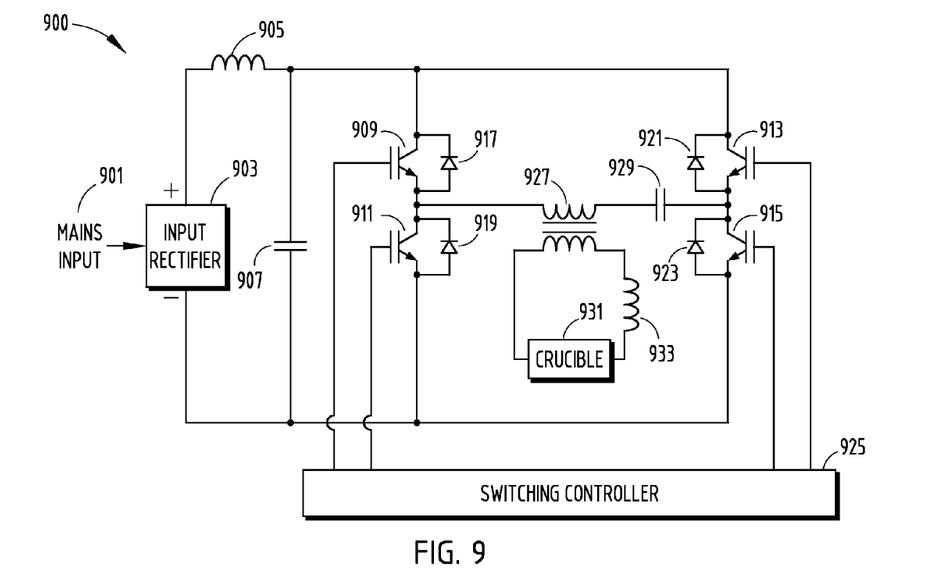
FIG. 9 is a schematic diagram illustrating the components used in providing a resonant circuit for use in the power supply for an EF furnace in accordance with an embodiment of the invention.

FIG. 9 is a schematic diagram illustrating a topology used in providing a resonant power supply in accordance with an embodiment of the invention. The supply 900 includes a mains input 901 used for supplying a 230 AC main power operating at 50 Hz-60 Hz. The mains input voltage is supplied to an input rectifier 903. The input rectifier 903 is used for converting the AC input voltage to a DC voltage. An inductor 905 and capacitor 907 form an input filter circuit that is connected to the output of the input rectifier 903. The input rectifier 903 contains one or more switching devices that may include but are not limited to a diode or a combination of diodes forming a full wave bridge rectifier. The input filter works to isolate the mains input voltage 901 from the higher frequency switched currents produced by an inverter as described herein. The values of the inductor 905 and capacitor 907 are selected for providing the necessary current for supplying an inverter circuit. The values of the inductor 905 and capacitor 907 are selected so as not to present a substantially high inductive or capacitive load to the mains input 901 thereby achieving a near unity power factor. When the values of these components are optimized, the input filter in combination with the load from the inverter appear to the mains input 901 as entirely resistive, i.e., without reactive components.

It should be evident that the inductor 905 can be located in any connection to input rectifier 903 or in some applications can be omitted. Capacitor 907 and inductor 905 are connected to a switching inverter formed by switching devices 909, 911, 913, 915 and their associated anti-parallel diodes 917, 919, 921, 923. For this technical application, switching devices 909, 911, 913, and 915 are insulated gate bipolar transistors (IGBT). Those skilled in the art will recognize that IGBTs are three-terminal power semiconductor devices specifically selected because of their efficiency and fast switching characteristics. Although IGBT transistors have been described for use in this technical application, those skilled in the art will further recognize that other transistor types such as bipolar junction transistors (BJTs), field effect transistors (FETs) or other types of switching devices could be utilized. When used in applications such as an electrode furnace, the inverter converts the voltage from the rectifier 903 into a higher frequency (e.g., 25 KHz), 100 Hz or 120 Hz modulated AC voltage. As described herein, this voltage will then be applied to the primary winding of transformer 927 in series with capacitor 929.

As seen in FIG. 9, the switching inverter is comprised of a plurality of IGBT switching devices used in combination to form parallel connected half bridge networks. The inverter uses a first half bridge comprised of switching devices 909, 911 and diodes 917, 919 and a second half bridge comprised of switching devices 913, 915 and diodes 921, 923 that are parallel connected and whose switching frequency is controlled by a switching controller 925. The switching controller 925 provides the control signals to the switching devices at some predetermined frequency. More specifically, the first half bridge is comprised of a switching device 909 and a transistor 911 that are series connected from their emitter to collector. The base of each of the transistor 909 and the transistor 911 are connected to the switching controller 925 for controlling their switching operation. Similarly, the second half bridge is comprised of the transistor 913 and the transistor 915 that are serially connected from emitter to collector. The base of the transistor 913 and the transistor 915 are connected to the switching controller 925 for controlling their switching operation. Since the IGBT can only pass current from its collector to emitter, anti-parallel diodes 917, 919, 921, 923 are connected from emitter to collector on each of the respective switching devices 909, 911, 913, 915 for allowing currents to flow in the opposite direction. Other switching devices such as FET transistors for allowing current flow control in multiple directions could also be used to replace switching devices 909, 911, 913, 915 eliminating the requirement for diodes 917, 919, 921, 923.

Both the first half bridge and the second half bridge are connected in parallel such that the collectors of transistors 909, 913 are connected to the positive terminal of the rectifier 903 through the inductor 905. Similarly, the emitters of the transistors 911, 915 are also connected to the negative terminal of the rectifier 903. The emitters of the transistor 909 and the transistor 913 form a series circuit consisting of the primary winding of a transformer 927 and a capacitor 929. Unlike a conventional pulse width modulated bridge circuit, both the first half bridge and the second half bridge are continuously switched at a fifty percent (50%) duty cycle. Each transistor, or its associated anti-parallel diode, are conducting for fifty percent (50%) of the inverter switching period. In use, the phase relationship between the transistor pair 909, 911 and transistor pair 913, 915 is altered by switching controller 925 for controlling the total energy applied to the resonant circuit comprised of the transformer 927, capacitor 929, crucible 931, and residual inductance 933.

Heat is generated due to the resistance of crucible 931 whenever current is flowing in the resonant circuit. Current will flow in the resonant circuit until all stored energy is transformed to heat by the resistance of crucible 931. In operation, energy is applied or increased to the resonant circuit when diagonal transistor pairs 909, 915 or 911, 913 are conducting simultaneously. Otherwise, the input to the resonant circuit is shorted and the energy stored in the resonant circuit is applied to the crucible 931 when either transistors 909, 913 or 911, 915 are conducting simultaneously. Control of the transistors occurs by applying a voltage from the switching controller 925 to the respective base junctions at the proper timing intervals. As described previously and with regard to FIG. 9, the resonant circuit formed by the secondary residual inductance 933 in combination with the capacitor 929 allow for a very efficient transfer of power to the crucible 931 when resonance is tuned to the same frequency as the inverter. When operating at this "tuned" or resonant frequency at maximum power output, the inverter will be controlled by switching controller 925 to switch transistors 909, 911, 913, 915 conduction at points where the resonant current has reached zero. This results in substantially low switching losses in the inverter.

Figure 10:
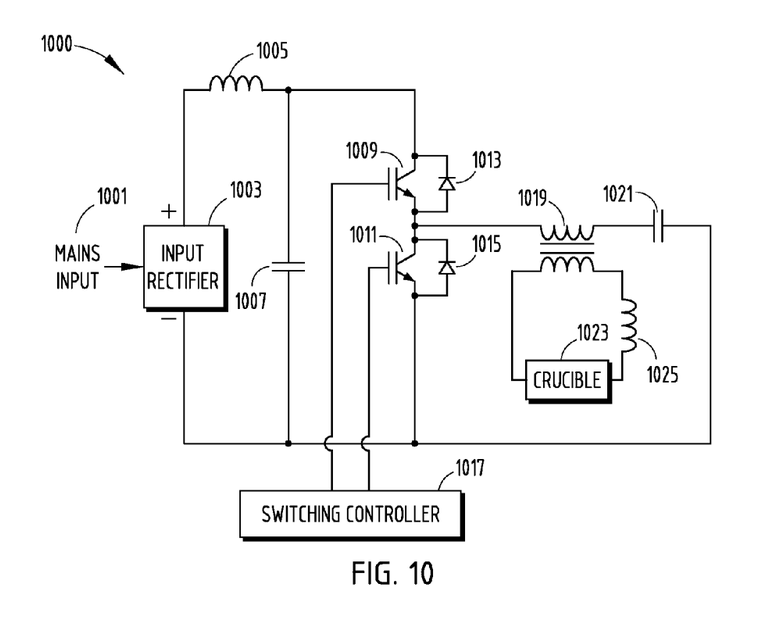
FIG. 10 is a schematic diagram illustrating an alternate topology used in providing a resonant power supply in accordance with an embodiment of the invention.

FIG. 10 is a schematic diagram illustrating an alternative switching inverter topology using a single half bridge in accordance with another embodiment of the invention. The supply 1000 includes a mains input 1001 used for supplying a 230 AC main power operating at 50 Hz-60 Hz. The mains input voltage is supplied to an input rectifier 1003. The input rectifier 1003 is used for converting the AC input voltage to a DC voltage. An inductor 1005 and capacitor 1007 form an input filter circuit that is connected to the output of the input rectifier 1003. The input rectifier 1003 contains one or more switching devices such as but not limited to a diode or a combination of diodes forming a full wave bridge rectifier. The input filter works to isolate the mains input voltage 1001 from the higher frequency switched currents produced by an inverter as described herein. The values of the inductor 1005 and capacitor 1007 are selected for providing the necessary current for supplying an inverter circuit. The values of the inductor 1005 and capacitor 1007 are selected so as not to present a substantially high inductive or capacitive load to the mains input 1001 thereby achieving a near unity power factor. When the values of these components are optimized, the input filter in combination with the load from the supply appear to the mains input 1001 as entirely resistive, i.e., without reactive components.

Those skilled in the art will recognize that inductor 1005 can be located at any connection to input rectifier 1003 or omitted in some applications. Capacitor 1007 and inductor 1005 are connected to a switching inverter formed by switching devices 1009, 1011 and their associated anti-parallel diodes 1013, 1015. For this technical application, switching devices 1009, 1011 are insulated gate bipolar transistors (IGBT). When used in applications, such as an electrode furnace, the inverter converts the voltage from the rectifier circuit 1003 into a higher frequency (e.g., 25 KHz), 100 Hz or 120 Hz modulated AC voltage. As described herein, this voltage will then be applied to the primary winding of transformer 1019 in series with capacitor 1021. Further, those skilled in the art will recognize that IGBTs are three-terminal power semiconductor devices specifically selected because of their efficiency and fast switching characteristics. Although IGBT transistors have been described for use in this technical application, those skilled in the art will further recognize that other transistor types such as bipolar junction transistors (BJTs), field effect transistors (FETs) or types of switching devices could be utilized.

As seen in FIG. 10, the switching inverter is comprised of a plurality of IGBT switching devices used in combination. The inverter uses a single half bridge comprised of 1009, 1011 whose switching frequency is controlled by a switching controller 1017. The switching controller 1017 provides the control signals to the switching devices at some predetermined frequency. More specifically, the single half bridge is comprised of a transistor 1009 and a transistor 1011 that are series connected from their emitter to collector. The base of each of the transistor 1009 and the transistor 1011 are connected to the switching controller 1017 for controlling their switching operation. Since the IGBT can only pass current from its collector to emitter, anti-parallel diodes 1013, 1015 are connected from emitter to collector on each of the respective transistors 1009, 1011 for allowing currents to flow in the opposite direction.

The collector of transistor 1009 is connected to the positive terminal of the rectifier 1003 through the inductor 1005. The emitter of the transistor 1011 is connected to the negative terminal of the rectifier 1003. The emitter of transistor 1009 is series connected to the collector of transistor 1011. The emitter of the transistor 1009 also connects to a series circuit consisting of the primary of a transformer 1019 and a capacitor 1021. Unlike a conventional pulse width modulated half bridge circuit, one transistor 1009 or 1011 is always in a conducting state. In use, the ratio of conducting time between transistor 1009, 1011 is altered by switching controller 1017 to control the total energy applied to the resonant circuit comprised of the transformer 1019, capacitor 1021, crucible 1023, and residual inductance 1025.

Heat is generated due to the resistance of crucible 1023 whenever current is flowing in the resonant circuit. Current will flow in the resonant circuit until all stored energy is transformed to heat by the resistance of crucible 1023. In operation, energy is applied or increased to the resonant circuit when transistor 1009, 1011 are switched at the proper time by switching controller 1017 as to increase the flow of current in the resonant circuit. Otherwise, the input to the resonant circuit is shorted and the energy stored in the resonant circuit is applied to the crucible 1023 when either transistors 1009, 1011 are held in a conducting state. Control of the transistors occurs by applying a voltage from the switching controller 1017 to the respective base junctions at the proper timing intervals. As described previously and with regard to FIG. 10, the resonant circuit formed by the secondary residual inductance 1025 in combination with the capacitor 1021 allow for a very efficient transfer of power to the crucible 1023 when resonance is tuned to the same frequency as the inverter. Maximum power output at resonance is achieved when each of the transistors 1009, 1011 are switched at a fifty percent (50%) duty cycle. Lower output power can be achieved by altering the ratio of duty cycle between transistors 1009, 1011. For example, when transistor 1009 or its associated diode 1013 are conducting for twenty percent (20%) of the resonant period, transistor 1011 or its associated diode 1015 will be conducting for eighty percent (80%) of the resonant period. When operating at this tuned or resonant frequency at maximum power output, the inverter will be controlled by switching controller 1017 as to switch transistors 1009, 1011 conduction at points where the resonant current has reached zero. This results in substantially low switching losses in the inverter.

Thus, an embodiment of the invention is a switching power supply for providing maximum power to a transformer coupled load containing high inductive reactance. The power supply includes an inverter connected with a step-down power transformer. In order to provide maximum power transfer to the load, the invention includes the use of a capacitor. The capacitor is connected in series with the primary winding of the transformer and works to resonate a secondary circuit inductance at a switching frequency of the inverter. This enables the maximum amount of power to be transferred to a crucible in applications where materials are heated in an electrode furnace.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A switching power supply for heating a graphite crucible in an electrode furnace for providing maximum power to a transformer coupled load containing high inductive reactance comprising:
    a supply of AC voltage;
    a rectifier circuit converting said AC voltage to a DC voltage;
    an inverter having an input coupled to said rectifier to receive said DC voltage, said inverter switching said DC voltage at a switching frequency of from 25 kHz to 1 MHz, said inverter having an output;
    at least one transformer having a primary winding and a secondary winding;
    a secondary circuit directly connected to said secondary winding, said secondary circuit including an electrode connected to a graphite crucible; and
    wherein said primary winding is coupled to said output of said inverter by a capacitor coupled in series with said primary winding and the capacitance of said capacitor and switching frequency is selected for providing operating power to said secondary circuit at a resonant frequency of said secondary circuit.

2. The switching power supply as defined in claim 1, wherein said secondary circuit is comprised of said secondary winding, an inductance, and said crucible.

3. The switching power supply as defined in claim 2, wherein said inductance is comprised of electrical leads coupling said transformer secondary winding to said crucible.

4. The switching power supply as defined in claim 1, wherein said inverter is comprised of a plurality of switching devices used to switch said DC voltage.

5. The switching power supply as defined in claim 1, wherein said inverter is comprised of at least one half bridge network used to switch an input voltage.

6. The switching power supply as defined in claim 5, and further comprising:
    a switching controller operating to conduct one of said switching devices of each of the at least one half bridge at all times.

7. The switching power supply as defined in claim 5, and further comprising a switching controller for operating each of the at least one half bridge network at a substantially fifty percent (50%) duty cycle.

8. The switching power supply as defined in claim 6, wherein the switching controller is adjusted for providing a near unity power factor.

9. The switching power supply as defined in claim 1, wherein an input to the inverter is connected to a filter network for isolating said rectifier circuit from peak currents of the inverter.

10. The switching power supply as defined in claim 1, further comprising an input filter coupled to said rectifier circuit for minimizing harmonic distortion to an AC power source.

11. The switching power supply as defined in claim 1, wherein said graphite crucible has a resistance of about 5.6 milliohms.

12. The switching power supply as defined in claim 1, wherein said resonant frequency is 25 kHz and said capacitor has a capacitance of about 0.5 uF.

13. A switching power supply for heating a graphite crucible in an electrode furnace for providing maximum power to the crucible comprising:
    a supply of AC voltage at a frequency of from 25 kHz to 1 MHz;
    at least one transformer having a primary winding coupled to said supply and a secondary winding;
    a secondary circuit directly connected to said secondary winding, said secondary circuit including an electrode connected to a graphite crucible; and
    wherein said primary winding is coupled in series with a capacitor having a capacitance selected for providing operating power to said secondary circuit at a resonant frequency of said secondary circuit.

14. The switching power supply as defined in claim 13, wherein said secondary circuit is comprised of said secondary winding, an inductance, and said crucible.

15. The switching power supply as defined in claim 14, wherein said inductance is comprised of electrical leads coupling said transformer secondary winding to said crucible.

16. The switching power supply as defined in claim 15, wherein said graphite crucible has a resistance of about 5.6 milliohms.

17. The switching power supply as defined in claim 16, wherein said resonant frequency is 25 kHz and said capacitor has a capacitance of about 0.5 uF.

* * * * *